United States Patent [19]

Fisher et al.

[11] 4,406,006

[45] Sep. 20, 1983

[54] DUAL-SIGNAL A-M RECEIVING APPARATUS

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 389,914

[22] Filed: Jun. 18, 1982

[51] Int. Cl.³ ........................ H04J 15/00; H04H 5/00

[52] U.S. Cl. .................................. 370/119; 179/1 GS

[58] Field of Search ........................... 370/119, 19, 20; 179/1 GS

[56] References Cited

U.S. PATENT DOCUMENTS

| | | | |
|---|---|---|---|
| 4,182,932 | 1/1980 | Fisher et al. | 179/1 GS |
| 4,238,642 | 12/1980 | Fisher et al. | 179/1 GS |
| 4,249,039 | 2/1981 | Fisher et al. | 179/1 GS |
| 4,268,914 | 5/1981 | Fisher et al. | 370/119 |
| 4,285,058 | 8/1981 | Fisher et al. | 370/119 |
| 4,308,614 | 12/1981 | Fisher et al. | 370/119 |

*Primary Examiner*—Douglas W. Olms

[57] ABSTRACT

Receiving apparatus for a modified quadrature A-M dual-signal wave, which samples the input wave and separates and reconstructs the signals in analog form. Superimposed noise in the frequency band of the modulated wave may be substantially reduced in both signals. The signals may be separated adequately to permit reception of a single compatible stereo transmission, or of either one of two different non-compatible mono transmissions on a single carrier, by use of negative-feedback timing loops.

7 Claims, 8 Drawing Figures

DUAL-SIGNAL A-M RECEIVING APPARATUS

BACKGROUND OF THE INVENTION

Receiving apparatus for a dual-signal modified quadrature A-M wave, using sampling and reconstruction means to separate the signals and reduce noise.

Prior-art dual-signal receivers shown in U.S. Pat. Nos. 4,182,932, 4,249,039, 4,255,751, and 4,236,042, use differing sampling trains and do not provide noise reduction. In this invention noise reduction circuits used are different from those of U.S. Pat. Nos. 2,249,260, 4,268,914, and 4,308,614. This invention solves the problem of simple dual-signal receiving apparatus both with and without noise-reduction circuits. It has utility for A-M stereo receiving apparatus.

SUMMARY OF THE INVENTION

The apparatus receives a modified quadrature A-M dual-signal transmission, separates the signals, and may also substantially reduce noise superimposed on the modulated carriers.

When the superimposed noise is not required to be reduced, the input wave is delivered to simple sampling means which is opened by a short gating pulse, and to a pulse-generating circuit which generates a stream of short gating pulses of a single polarity, at the carrier frequency divided by an integer.

Gating pulses are delivered at instants of zero-crossings of the second modulated carrier in the input wave, to the sampling means, at a frequency greater than twice the highest frequency of the signals, so that this first stream of pulses results in a first stream of samples of the first modulated carrier of a first polarity, which fully defines the first signal at the output of the sampling means. These samples because of their polarity, pass through separation means to a first signal filter, which reconstructs, passes and delivers them as the first signal and noise, substantially free from the second signal.

Gating pulses are delivered at instants of zero-crossings of the first modulated carrier in the input wave at the same frequency as the first stream, so that this second stream of gating pulses results in a second stream of samples of a second polarity of the second modulated carrier, which fully defines the second signal and noise, at the output of the sampling means. These samples, because of their polarity, pass through separation means to a filter, which reconstructs, passes and delivers them as the second signal and noise in analog form, substantially free from the first signal.

When superimposed noise, in the frequency band of the modulated carriers of the input wave, is to be reduced by the receiving apparatus, the gating pulses may have a single polarity, at a frequency of twice the carrier divided by an odd integer, and the output of the single sampling means may pass through a reversing circuit, which reverses the polarity of every alternate sample of each carrier. Its output consists of four streams of samples. The first stream has a first polarity and fully defines the first signal. The second stream fully defines the noise in the signal frequency band, with amplitude and polarity substantially uncorrelated between samples of the stream. The third stream has a second polarity and fully defines the second signal, and the fourth stream fully defines the noise in the signal frequency band, substantially uncorrelated as in the second stream, but with reversed polarity.

The first stream is delivered by polarity-sensitive separation means, is passed and reconstructed in first reconstruction means and delivered as the first signal. The second and fourth streams are passed to both reconstruction means and cancel one another in these means. The third stream is passed to, and reconstructed in a second reconstruction means and delivered as the second signal.

Alternatively, the sampling means is a bipolar gate, that is a gate which delivers an unreversed sample of the input wave when it receives a gating pulse of a first polarity, and delivers a reversed sample of the input wave when it receives a gating pulse of a second polarity. Bipolar gates are widely used in frequency-division multiplex systems.

Gating pulses of alternately first and second polarities are delivered to the bipolar sampling gate in an order which produces the same four sample streams as the output of the reversing circuit described above.

A second alternative is apparatus using a first bipolar gate which samples the input wave, at zero-crossings of the second carrier spaced an odd integral number of carrier half-periods, with gating pulses of alternate polarities, so that the first carrier samples are all of the same polarity, but the noise samples are alternately reversed, and all samples are reconstructed to deliver the first signal in analog form, free from the second signal and noise. Similarly a second bipolar gate produces samples which are integrated to deliver the second signal in analog form, free from the first signal and noise.

DETAILED DESCRIPTION OF THE INVENTION

Figure 1:
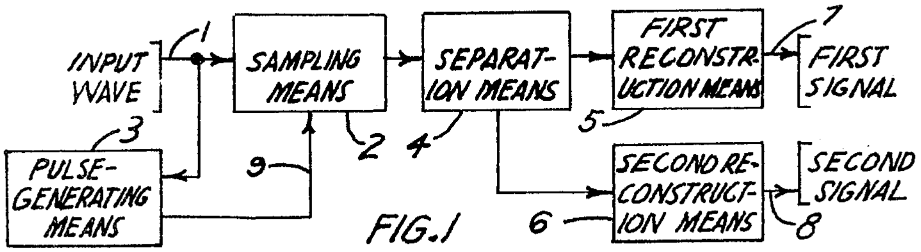
FIG. 1 shows a simplified block schematic basic circuit diagram of receiving apparatus according to the invention, for separating the signals of a dual-modulated wave, with or without reduction of noise.

FIG. 1 shows a simplified basic block schematic circuit diagram of receiving apparatus according to the invention for separating the signals of a dual-modulated wave, with or without noise reduction.

The input wave consists of a first carrier double-sideband amplitude modulated by a first signal with a known highest frequency, and a second carrier of the same frequency as the first carrier, separated in phase from the first carrier by a phase angle, which is double-sideband amplitude modulated by a second signal with a known highest frequency, with superimposed noise in the frequency band of the modulated carriers. It may also include a first pilot, amplitude modulated on the first carrier, and a second pilot, with a frequency substantially different from the frequency of the first pilot, amplitude modulated on the second carrier.

The input wave is delivered on lead 1 to pulse-generating means 3 and sampling means 2. Pulse-generating means 3, shown in detail in FIG. 6, generates a stream of short pulses which are delivered as gating pulses through first pulse-delay means 38 on lead 49, occurring at instants of zero-crossings of the second carrier, at a frequency greater than twice the highest frequency of either signal; and through second pulse-delay means 40 as a second stream of gating pulses on lead 48, of the same duration as the first stream, occurring at instants of zero-crossings of the first carrier. Leads 48 and 49 when connected together are designated lead 9.

Sampling means 2 delivers its output, with the same polarity of all gating pulses, to separation means 4, which separates samples of the first modulated carrier from samples of the second modulated carrier and delivers the samples of the first modulated carrier for first reconstruction means 5, which reconstructs, passes and delivers them on lead 7 in analog form as the first signal. Samples of the second modulated carrier are delivered by separation means 4 to second reconstruction means 6, which reconstructs, passes and delivers them on lead 8 in analog form as the second signal.

Figure 2:
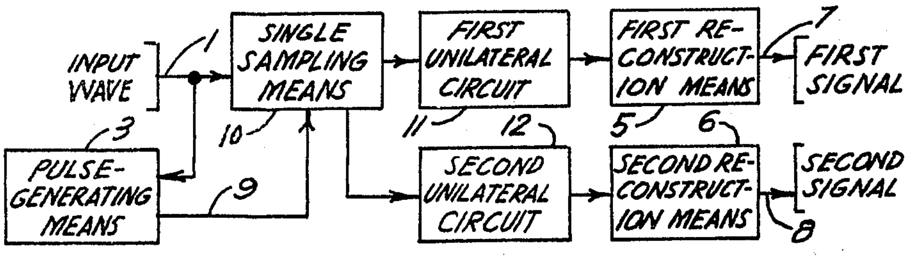
FIG. 2 shows a simplified block schematic circuit diagram of receiving apparatus according to the invention, for separating the signals of a dual-modulated wave without reduction of noise.

FIG. 2 shows a simplified block schematic circuit diagram of receiving apparatus according to the invention, for separating the signals of a dual-modulated wave without reduction of noise.

An input wave, the same as the input wave in FIG. 1, is received on lead 1 and is delivered to pulse-generating means 3 and to single sampling means 10. Single sampling means 10 delivers a sample of a first polarity of the first carrier, when it receives gating pulses at instants of zero-crossings of the second carrier, spaced an integral number of carrier periods. The output of sampling means 10 is delivered to first unilateral circuit 11, which may be a diode, which passes samples of a first polarity to first reconstruction means 5, and thence to lead 7 as the first signal in analog form, free from the second signal. The output of single sampling means 10 is also delivered to second unilateral circuit 12, which may be a diode, which passes samples of the second carrier, of a second polarity, when sampling means 10 receives gating pulses at instants of zero-crossings of the first carrier, to second reconstruction means 6, and thence to lead 8 as the second signal in analog form, free from the first signal.

Figure 3:
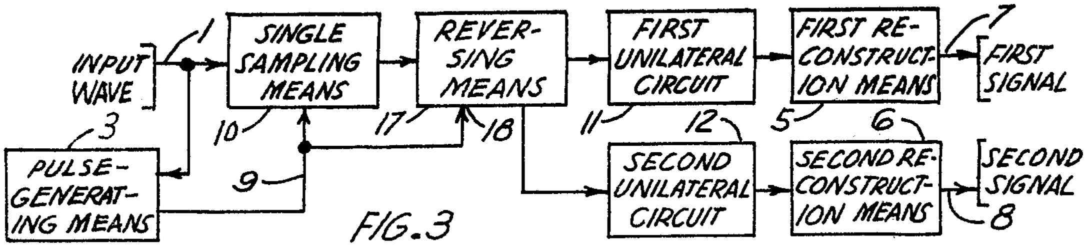
FIG. 3 shows a simplified block schematic circuit diagram of receiving apparatus according to the invention, for separating the signals of a dual-modulated wave, with reversing means for reducing noise.

FIG. 3 shows a simplified block schematic circuit diagram of receiving apparatus according to the invention, for separating the signals of a dual-modulated wave, with reversing means for reducing noise.

An input wave, the same as the input wave of FIG. 1, is received on lead 1 and is delivered to pulse-generating means 3 and to single sampling means 10. Pulse-generating means 3 delivers gating pulses over lead 9 to single sampling means 10 at instants of zero-crossings of the second carrier, spaced an odd integral number of carrier half-periods, and at instants of zero-crossings of the first carrier, spaced an odd integral number of carrier half-periods. The output of sampling means 10 is delivered to terminal 18 of reversing means 17, shown in detail in FIG. 4. First and second outputs of reversing means 17 are delivered through first and second unilateral circuits 11 and 12 respectively, to first and second reconstruction means 5 and 6 respectively, and output leads 7 and 8, respectively. The output leads each deliver a different one of the signals, substantially free from the other signal and from noise. Samples of the first carrier, after reversal of alternate samples, have the correct polarity to pass first unilateral circuit 11. Noise samples are uncorrelated in amplitude and polarity, alternately reversed, pass first unilateral circuit 11 and are mutually cancelled in first reconstruction means 5. The first modulated carrier samples are added to produce the first signal free from noise. Similarly, the samples of the second carrier, after passing through reversing means 17, are delivered through second unilateral circuit 12 to second reconstruction means 6, and deliver the second signal on lead 8, free from noise.

Figure 4:
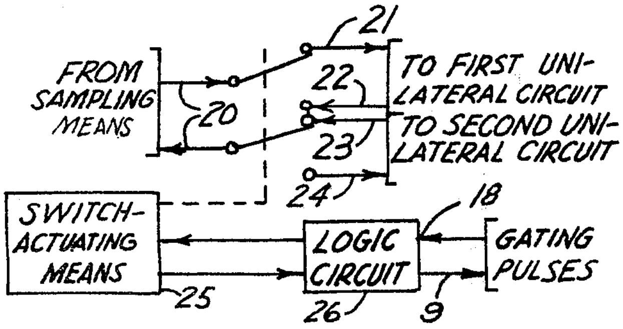
FIG. 4 shows a simplified block schematic circuit diagram suitable for the reversing means of FIG. 3.

FIG. 4 shows a simplified block schematic circuit diagram of apparatus suitable for use as reversing means 17 in FIG. 3, with two-wire current paths shown for clarity. Sampling means 10 delivers samples of the input wave over leads 20, to switch arms which alternately contact leads 21 and 22 to the first unilateral circuit 11, and leads 23 and 24 to second unilateral circuit 12, respectively. Gating pules from lead 9 are received on terminal 18 of logic circuit 26, which counts gating pulses and after every pair of pulses, delivers a command pulse to switch-actuating means 25, which moves the reversing switch from one position to the other, to deliver samples of modulated carriers and noise as described above and in FIG. 7.

Figure 5:
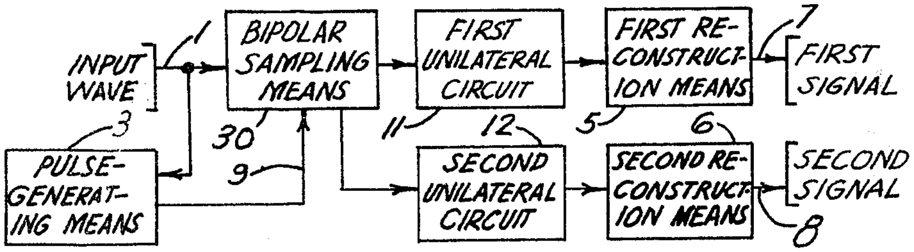
FIG. 5 shows a simplified block schematic circuit diagram of receiving apparatus according to the invention, for separating the signals of a dual-modulated wave, with a bipolar sampling gate for reducing noise.

FIG. 5 shows a simplified block schematic circuit diagram of apparatus according to the invention, for separating the signals of a dual-modulated wave, with bipolar sampling means for reducing noise.

An input wave the same as the input wave of FIG. 1 is received on lead 1 and is delivered to pulse-generating means 3 and to bipolar sampling means 30. Pulse-generating means 3 delivers alternately positive and negative gating pulses over lead 9 to bipolar sampling means 30, described above in the Summary.

Output samples from bipolar sampling means 30 are delivered through first unilateral circuit 11, and first reconstruction means 5, to lead 7 as an analog replica of the first signal, substantially free from the second signal and from superimposed noise. Output sample sequences from bipolar sampling means 30 are also delivered through second unilateral circuit 12 and second reconstruction means 6, to lead 8 as an analog replica of the second signal, substantially free from the first signal and from superimposed noise.

Figure 6:
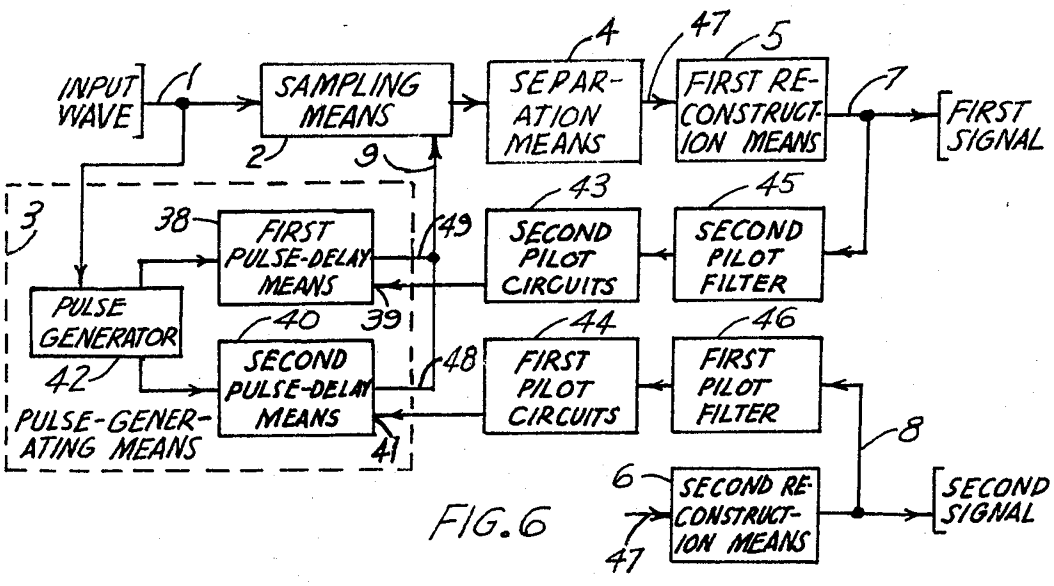
FIG. 6 shows a simplified block schematic circuit diagram of dual-modulation receiving apparatus according to the invention, for separating the signals of a dual-modulated wave, using negative-feedback loops for timing the gating pulses.

FIG. 6 shows a simplified block schematic circuit diagram of dual-modulation receiving apparatus according to the invention, for separating the signals, using negative-feedback loops for timing the gating pulses. FIG. 6 can be used with the apparatus of FIGS. 1, 2, 3, 5 and 8, in order to improve the separation ratio of the signals.

In each figure referred to above, the input wave on lead 1 is delivered to pulse-generating means as shown at 3 in FIG. 6. This comprises pulse generator 42 which derives the carrier from lead 1, substantially free from sidebands and noise, and delivers a stream of short pulses to first pulse-delay means 38 with delay-control terminal 39, and second pulse-delay means 40 with delay-control terminal 41. The output of pulse generator 42 has a frequency equal to the carrier frequency divided by the ratio of two integers. The outputs of first pulse-delay means 39 and second pulse-delay means 40 are delivered as gating pulses to a gate which samples the wave on lead 1 at instants of zero-crossings of the first and second carriers, as shown in FIG. 7.

Second pilot filter 45 receives and passes any traces of the second pilot, free from other waves, present on lead 7, and first pilot filter 46 receives and passes any traces of the first pilot, free from other waves, present on lead 8, in FIGS. 1, 2, 3, 5, 6 and 8. Second pilot circuits 43 receive, amplify, equalize in delay and frequency response, rectify and filter the second pilot from second pilot filter 45, and deliver a dc potential to delay-control terminal 39, so that first pulse-delay means 38, sampling means 2, separation means 4, first reconstruction means 5, lead 7, second pilot filter 45 and second pilot circuits 43, form a first negative-feedback loop, which adjusts the instants of gating pulses from first pulse-delay means 38, so as to reduce to a minimum the amplitude of the second pilot on lead 7, in accordance with conventional negative-feedback theory.

Similarly, first pilot circuits 44 receive, amplify, equalize in delay and frequency response, rectify and filter the first pilot selected by first pilot filter 46 from lead 8, and deliver a dc potential to delay-control terminal 41 on second pulse-delay means 40, so that second pulse-delay means 40, sampling means 2, separation means 4, second reconstruction means 6, lead 8, first pilot filter 46 and first pilot circuits 44, form a second negative-feedback loop, which adjusts the instants of gating pulses from second pulse-delay means 40, so as to reduce to a minimum the amplitude of the first pilot on lead 8.

Figure 7:
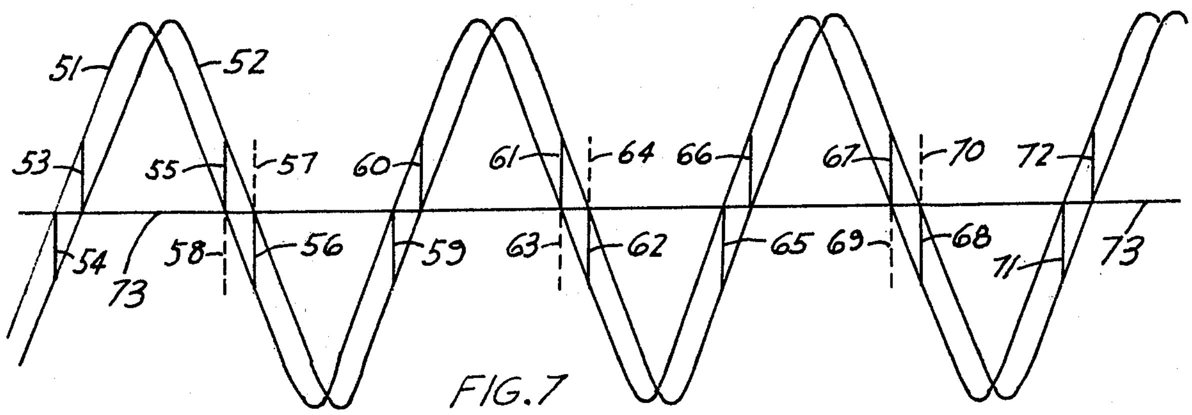
FIG. 7 shows the timing and polarity of gating pulses and samples for the apparatus of FIGS. 1, 2, 3, 4, 5, 6 and 8.

FIG. 7 shows first carrier 51 and second carrier 52 on lead 1 of FIGS. 1, 2, 3, 5, 6 and 8, unmodulated for clarity of presentation, with gating pulses of lead 9 of FIGS. 1, 2, 3, 4, 5, 6 and 8 shown on time base 73.

For explanation of the operation of FIG. 2, the gating pulses and resultant samples of a first polarity of the first carrier at instants of zero-crossings of the second carrier are shown as 53, 60, 66 and 72, when the pulse spacing is one carrier period. Spacings of an integral number of carrier periods, such as 53 and 66, or 53 and 72 may also be used. These pulses produce samples which pass circuit 11 are reconstructed in first reconstruction means 5 as the first signal and delivered to lead 7. The gating pulses producing samples of a second polarity of the second carrier at instants of zero-crossings of the first carrier are shown as 54, 59, 65 and 71, when the spacing is one carrier period. Spacings of an integral number of carrier periods such as 54 and 65, or 54 and 71 may also be used. These pulses produce samples which pass circuit 12, are reconstructed in second reconstruction means 6 and are delivered as the second signal on lead 8.

In FIG. 3 pulses on lead 9, producing samples of alternate polarity of the first carrier at instants of zero-crossings of the second carrier, are shown in FIG. 7 as 53, 56, 60, 62, 66, 68 and 72 when they are spaced one carrier half-period apart. Spacing may also be an odd integral number of carrier half-periods, such as 53, 62 and 72, or 53 and 68. These pulses produce samples which, when alternately reversed, such as 53, 57, 60, 64, 66, 70 and 72, or 53, 64 and 72, or 53 and 70, pass circuit 11, and are reconstructed in means 5 as the first signal and appear on lead 7. Noise samples, of polarity and amplitude of low correlation, accompany the carrier samples, and when alternately reversed and reconstructed, in reconstruction means 5, cancel one another and do not appear on lead 7.

The gating pulses at instants of zero-crossings of the first carrier, producing samples of alternate polarity of the second carrier, are shown as 54, 55, 59, 61, 65, 67 and 71, when they are spaced one carrier half-period apart. Spacing may also be an integral number of carrier half-periods, such as 54, 61 and 71, or 54 and 67. These pulses produce second carrier samples which, when alternately reversed, as 54, 58, 59, 63, 65, 69 and 71, or 54, 63 and 71, or 54 and 69, pass circuit 12, are reconstructed in second reconstruction means 6 as the second signal and appear on lead 8. Noise samples of polarity and amplitude of low correlation accompany the carrier samples, and when alternately reversed and reconstructed cancel one another, and do not appear on lead 8.

In FIG. 5, gating pulses producing samples of a first polarity of the first carrier at zero-crossings of the second carrier, are delivered on lead 9 from lead 49 of FIG. 6, to bipolar sampling means 30 and are alternately positive and negative.

In a bipolar gate, a gating pulse of one polarity produces an unreversed sample of the input wave, and a gating pulse of an opposite polarity produces a reversed sample of the input wave.

Pulses of alternate polarities occur in FIG. 7, when the spacing is one carrier half-period, at 53, 56, 60, 62, 66, 68 and 72. Spacing may also be an odd integral number of carrier half-periods, such as 53, 62 and 72, or 53 and 68. These produce samples of the first carrier which are alternately reversed, as 53, 57, 60, 64, 66, 70 and 72, or 53, 64 and 72, or 53 and 70, which pass through circuit 11, are reconstructed in means 5 and appear on lead 7 as the first signal.

Pulses producing samples of a second polarity of the second carrier at zero-crossings of the first carrier are delivered on lead 9 from lead 48 of FIG. 6, to bipolar sampling means 30, and are alternatively positive and negative. Such pulses occur in FIG. 7, when the spacing is one carrier half-period, at 54, 55, 59, 61, 65, 67, and 71. Spacing may also be an odd integral number of carrier half-periods, such as 54, 61 and 71 or 54 and 67. The resulting samples are alternately reversed, as 54, 58, 59, 63, 65, 69 and 71, and pass through circuit 12, are reconstructed in second reconstruction means 6, and appear on lead 8 as the second signal.

Samples of the noise on lead 1, accompany all carrier samples, and are alternately reversed with the carrier samples by the bipolar sampling gate, and as they have low correlation of amplitude and polarity they cancel one another in reconstruction means 5 and 6, and the noise does not appear on leads 7 and 8.

FIG. 6 shows a simplified block schematic circuit of dual-modulation receiving apparatus according to the invention, for separating the signals of a dual-modulated wave, using negative-feedback loops for timing the gating pulses. FIG. 6 is the same as FIG. 1, except that the leads delivering the output of separation means 4 to first and second reconstruction means 5 and 6 respectively have been designated 47 for clarity of drawing, the detailed circuit of pulse generating means 3 has been shown, as described, and negative-feedback timing loops have been added.

The first negative-feedback loop comprises second pilot filter 45, which receives any traces of the second pilot on lead 7, and delivers it free from sidebands and noise to second pilot circuits 43, where it is amplified, equalized in delay and frequency response, rectified and filtered, to deliver a dc potential to delay-control terminal 39 on first pulse-delay means 38. First pulse-delay means 38, sampling means 2, separation means 4, lead 47, first reconstruction means 5, lead 7, second pilot filter 45 and second pilot circuits 43, by negative-feedback theory, form a negative-feedback loop, which minimizes the amplitude of the second pilot on lead 7.

Similarly, a second negative-feedback loop comprises first pilot filter 46, which receives any traces of the first pilot on lead 8, and delivers it free from sidebands and noise to first pilot circuits 44, where it is amplified, equalized in delay and frequency response, rectified and filtered, to deliver a dc potential to delay-control terminal 41 on second pulse-delay means 40. Second pulse-delay means 40, sampling means 2, separation means 4, lead 47, second reconstruction means 6, lead 8, first pilot filter 46, and first pilot circuits 44, by negative-feedback theory, form a negative-feedback loop which minimizes the amplitude of the first pilot on lead 8.

All pulses sequences required by FIGS. 1, 2, 3, 4, 5, 6 and 8 can be produced by pulse-generating means 3 of FIG. 6. Pulse generator 42 may produce a sequence of short pulses of alternate or the same polarities, at a frequency equal to twice the carrier frequency divided by an integer. First pulse-delay means 38 may deliver pulses at instants of zero-crossings of one carrier over lead 49, and second pulse-delay means 40 may deliver pulses at instants of zero-crossings of the other carrier over lead 48. The outputs of the pulse-delay means may be of the same or different polarities.

Figure 8:
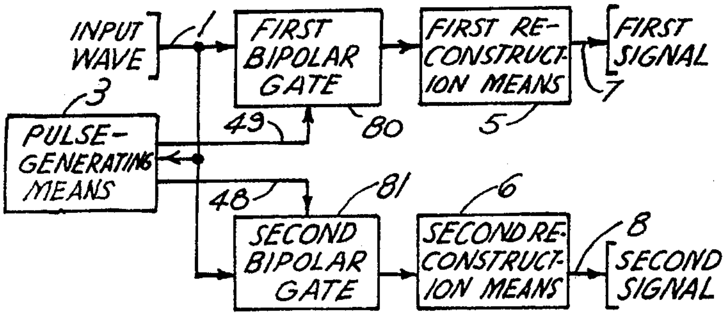
FIG. 8 shows a simplified block schematic circuit diagram of receiving apparatus according to the invention, for receiving and separating the signals of a dual-modulated wave, with separate bipolar sampling gates, for reduction of noise on each signal.

In FIG. 8 the input wave of FIG. 1 is delivered by lead 1 to first bipolar gate 80, second bipolar gate 81 and pulse-generating means 3. Pulse-generating means 3 delivers a stream of gating pulses of alternate polarities to first bipolar gate 80 over lead 49, at instants of zero-crossings of the second carrier in the input wave, spaced an odd integral number of carrier half-periods. Thus gate 80 delivers a train of samples of the first carrier of the same polarity such as 53, 57, 60, 64, 66, 70 and 72 in FIG. 7. These samples are reconstructed in first reconstruction means 5 to deliver the first signal on lead 7. Alternate reversed noise samples, which have low correlation between samples in amplitude and polarity, are reconstructed and cancelled in first reconstruction means 5.

Pulse-generating means 3 delivers a stream of gating pulses of alternate polarities over lead 48 to bipolar gate 81, at instants of zero-crossings of the first carrier, spaced an odd integral number of carrier half-periods, which produce samples such as 54, 58, 59, 63, 65, 69 and 71, shown in FIG. 7. These samples are reconstructed in second reconstruction means 6 to deliver the second signal on lead 8. Alternate reversed noise samples, which have low correlation between samples in amplitude and polarity, are reconstructed and canceled in second reconstruction means 6.

We claim:

1. Receiving apparatus for an input wave, comprising a first carrier, transmitted or partly suppressed, double-sideband amplitude modulated by a first signal with a first highest frequency, and a second carrier, with the same frequency as, and spaced in phase angle from, said first carrier, double-sideband amplitude modulated by a second signal with a second highest frequency, and superimposed noise in the frequency band of said first and said second modulated carriers; which comprises:

pulse-generating means, which receives said input wave and which generates a sequence of short gating pulses occurring alternately substantially at zero-crossings of said second carrier, at a frequency greater than twice the highest frequency of said first and said second signals, and at zero-crossings of said first carrier, at the same frequency, and sampling means, consisting of a gate which receives and samples said input wave at instants of gating pulses received from said pulse-generating means, and separation means, which receives the output of said sampling means and separates the components of said input wave, and first reconstruction means, which receives a first output of said separation means, and reconstructs and delivers said first signal, substantially free from said second signal, and second reconstruction means, which receives a second output of said separation means, and reconstructs and delivers said second signal, substantially free from said first signal.

2. Receiving apparatus in accordance with claim 1 in which said gating pulses occur with a first frequency at instants of said zero-crossings of said first carrier, spaced apart at least one or more integral carrier periods, and said gating pulses occur with said first frequency at instants of said zero-crossings of said second carrier, said instants of zero-crossings of said second carrier occuring at a space of said phase angle between said carriers, or said phase angle between said carriers plus an integral number of carrier periods, from said instants of zero-crossings of said first carrier, and in which said sampling means consists of a gate which is opened by said gating pulses of one polarity.

3. Receiving apparatus in accordance with claim 2 in which said separation means consists of a first unilateral circuit which passes samples of a first polarity to said first reconstruction means, and a second unilateral circuit passing samples of a second polarity to said second reconstruction means.

4. Receiving apparatus in accordance with claim 2, in which said separtion means consists of a reversing circuit which consists of a polarity-reversing switch, which receives said sequence of samples of said input wave from said sampling gate, and which is actuated by a logic circuit receiving said sequence of gating pulses, and which passes, unreversed in polarity, a first pair and every odd-numbered pair thereafter, of adjacent samples of said first and said second modulated carriers, and passes reversed in polarity the second pair and every even-numbered pair thereafter, of adjacent samples of said first and said second modulated carriers, and which delivers its output to a first unilateral circuit which passes samples of a first polarity, and to a second unilateral circuit which passes samples of a second polarity.

5. Receiving apparatus in accordance with claim 1, in which:

said pulse-generating means generates a sequence of pairs of short gating pulses, of which the first pair and odd-numbered pairs thereafter have a first polarity, and the members of each such pair occur at instants of a zero-crossing of said first carrier and of a zero-crossing of said second carrier, respectively, and of which the second pair and odd-numbered pairs thereafter have a second polarity and the members of each such pair occur at instants of a zero-crossing of said first carrier and of a zero-crossing of said second carrier, respectively, and said sampling means consists of a single bipolar gate, which delivers a sample of the input wave unreversed in polarity when said bipolar gate receives a gating pulse of a first polarity, and delivers a sample of the input wave reversed in polarity when said bipolar gate receives a gating pulse of a second polarity, and said separation means consists of a first unilateral circuit passing samples of a first polarity to said first reconstruction means, and a second unilateral circuit passing samples of a second polarity to said second reconstruction means.

6. Receiving apparatus in accordance with claim 1, in which said first signal includes a sine wave as a first pilot, of substantially constant amplitude and frequency, substantially below other components of said first signal in frequency, and said second signal includes a sine wave as a second pilot, of substantially constant amplitude and frequency, substantially below other components of said second signal and substantially different from said first pilot, in frequency.

7. Pulse-generating means in accordance with claim 6 in which the timing of gating pulses occurring substantially at instants of zero-crossings of said second carrier is controlled, in a first negative-feedback loop, by a dc potential applied to a first delay-control terminal on said pulse-generating means, derived from said second pilot at the output of said first reconstruction means, through a second pilot filter which delivers said second pilot substantially free from other waves, to second pilot circuits which amplify, equalize in delay and frequency response, rectify and filter said second pilot and deliver it as said dc potential, with a polarity which reduces the amplitude of said second pilot at the output of said first reconstruction means; and in which the timing of gating pulses occurring substantially at instants of zero-crossings of said first carrier is controlled, in a second negative-feedback loop, by a dc potential applied to a second delay-control terminal on said pulse-generating means, derived from said first pilot, at the output of said second reconstruction means, through a first pilot filter which delivers said first pilot substantially free from other waves, to first pilot circuits which amplify, equalize in delay and frequency response, rectify and filter said second pilot, and deliver it as said dc potential with a polarity which reduces the amplitude of said first pilot at the output of said second reconstruction means.

* * * * *